United States Patent Office 2,889,019
Patented June 2, 1959

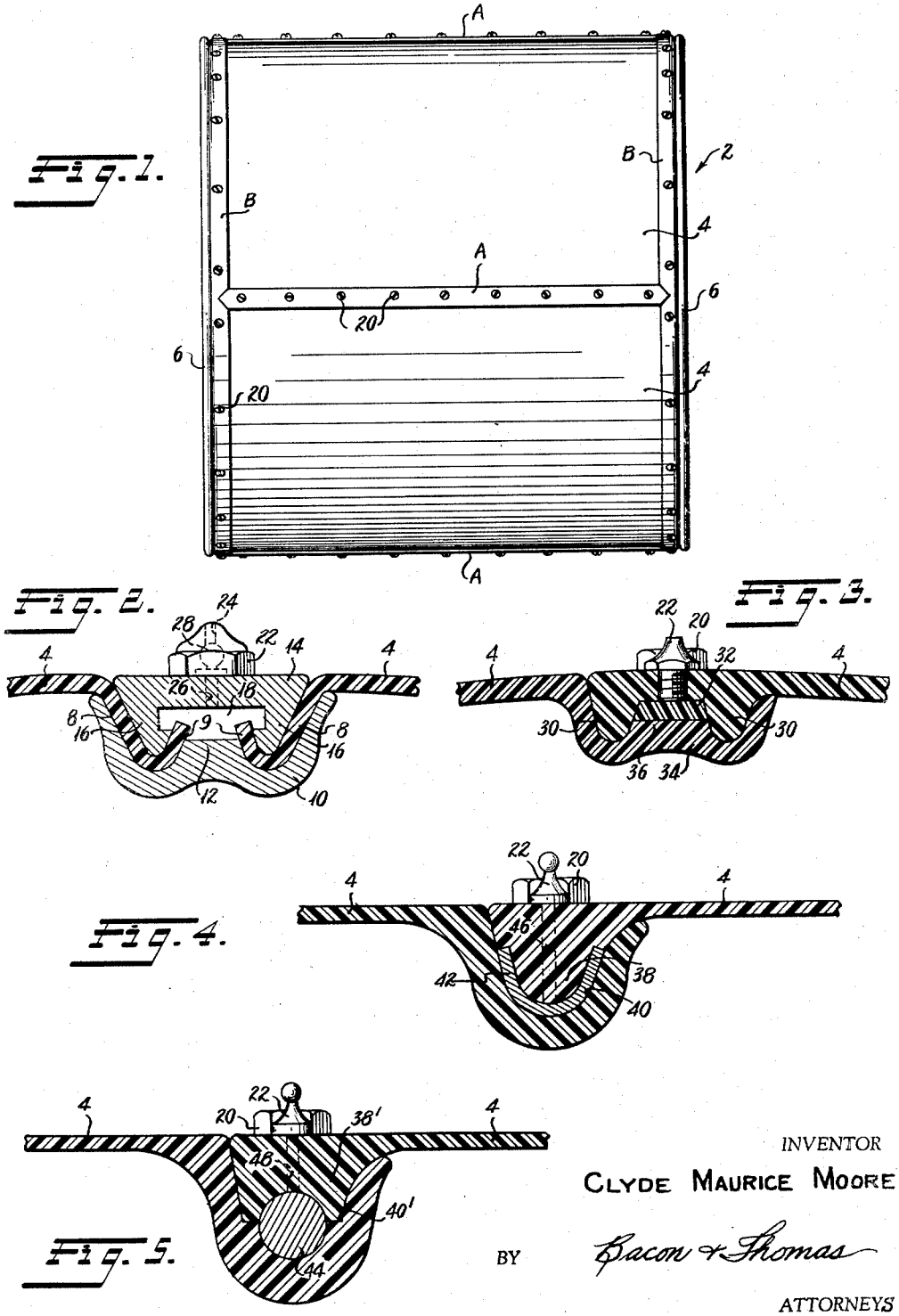
June 2, 1959 — C. M. MOORE — 2,889,019
PRESSURE SEALED JOINT
Filed Nov. 18, 1954 — 3 Sheets-Sheet 1
INVENTOR
CLYDE MAURICE MOORE
BY Bacon & Thomas
ATTORNEYS June 2, 1959  C. M. MOORE  2,889,019
PRESSURE SEALED JOINT
Filed Nov. 18, 1954  3 Sheets-Sheet 2
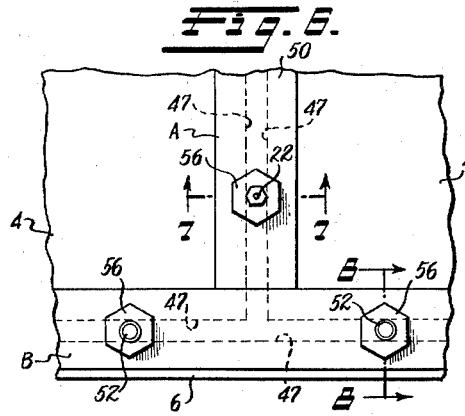
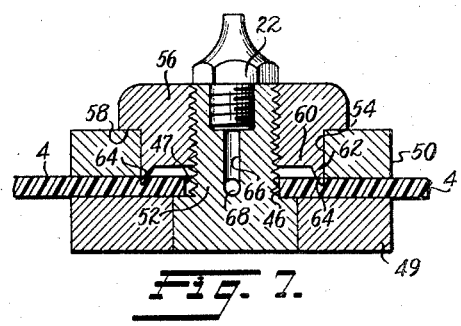
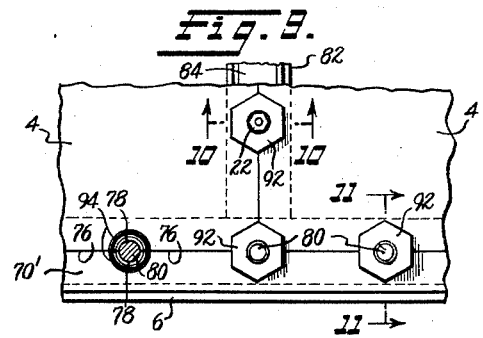
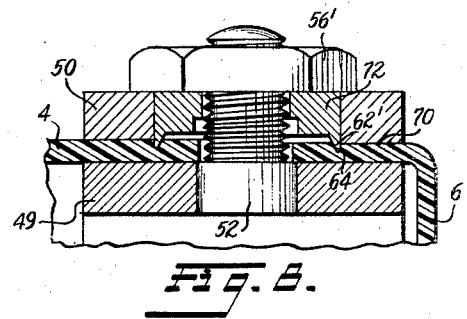
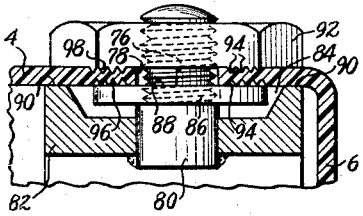
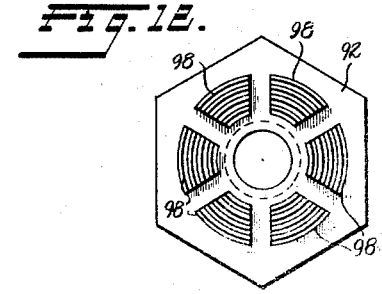
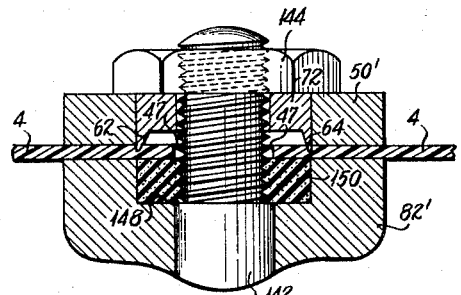
INVENTOR
CLYDE MAURICE MOORE
BY Bacon & Thomas
ATTORNEYS June 2, 1959  C. M. MOORE  2,889,019
PRESSURE SEALED JOINT
Filed Nov. 18, 1954  3 Sheets-Sheet 3
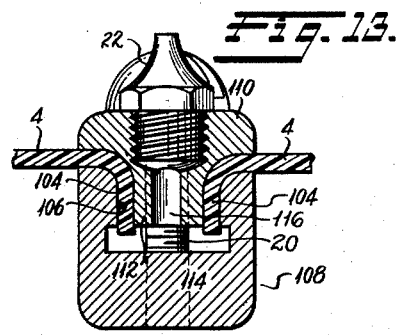
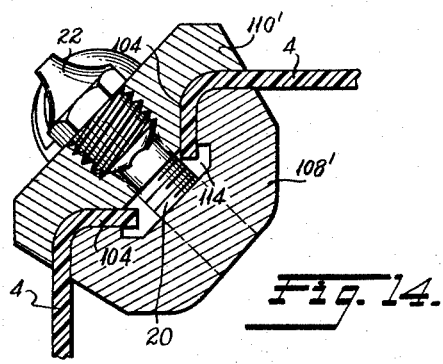
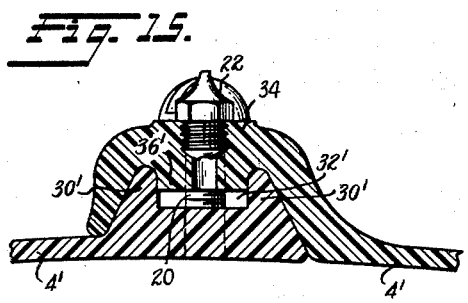
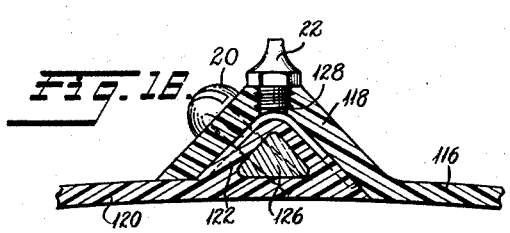
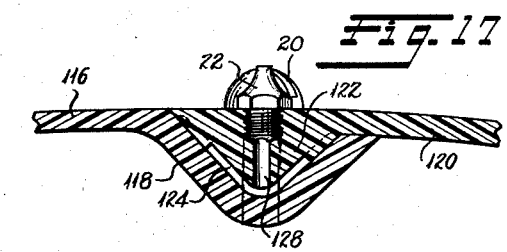
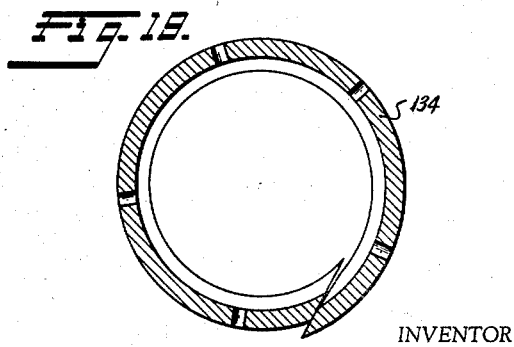
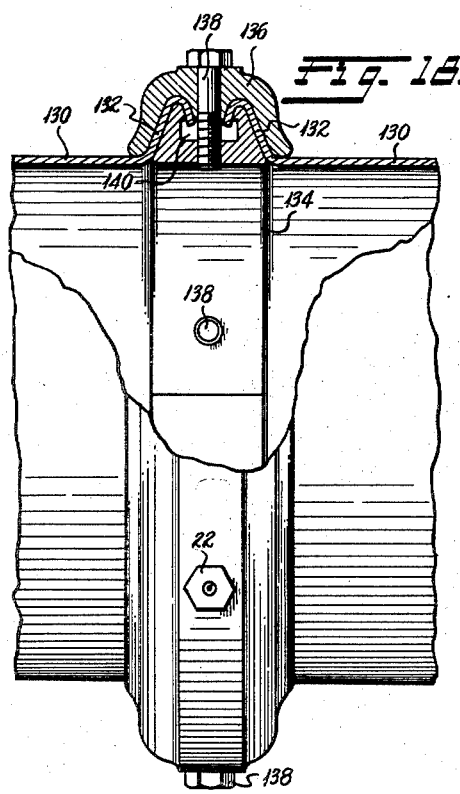
INVENTOR
CLYDE MAURICE MOORE
BY Bacon & Thomas
ATTORNEYS

2,889,019

PRESSURE SEALED JOINT

Clyde Maurice Moore, Richmond, Va.

Application November 18, 1954, Serial No. 469,608

7 Claims. (Cl. 189—36)

This application is a continuation-in-part of the application of Clyde Maurice Moore, Serial No. 209,169, filed February 2, 1951, for Sealed Structural Joint, now Patent No. 2,751,109, patented June 19, 1956, and is also a continuation-in-part of the application of Clyde Maurice Moore, Serial No. 228,052, filed May 24, 1951, for Integral Joint Structure, now Patent No. 2,727,286, patented December 20, 1955.

This invention relates to structural joints, with particular reference to sealed joints for structures assembled from separate prefabricated panels. Such structures may take the form of shipping containers or may be conduits, pipe, open or closed storage tanks, or the like.

It is highly desirable to provide prefabricated parts for structures of the type mentioned that may be assembled by the ultimate user from a kit of relatively flat parts that may be shipped and/or stored without occupying an undue amount of space. Such prefabricated parts may be assembled to form a permanent structure or may be assembled and sealed in such a manner that they may thereafter be disassembled for moving or return shipment. It is often also desirable to construct pipes or conduits having completely sealed joints without the necessity of welding or employing heat for that purpose. The present invention provides a joint structure satisfying those needs.

In general, the present invention relates to a joint between adjacent wall panels of a structure, which structure may be a container, storage tank, or the like having a plurality of peripheral panels or an elongated pipe or conduit having cylindrical sections joined together at their ends.

The invention in brief comprises an arrangement wherein the edges of panels defining the walls of the desired structure are brought into adjacent relationship and clamping means are applied to mechanically clamp and lock the panels in that relationship. The clamping means further cooperate with the panels to define peripherally closed passageways extending along the joint, the walls of which passageways are defined at least in part by edge portions of the panels themselves. The joint further includes means for admitting a suitable liquid sealing material under pressure into the passageway after the joint has been mechanically assembled whereby the sealing material may flow throughout the length of the joint and into intersecting joints to engage the edge portions of adjacent wall panels and completely seal the structural joint. The sealing material may, at the user's choice, be a material that remains substantially liquid, it may be a material that hardens to form a resilient seal, or it may be in the nature of a cement compatible with the material of the panels to permanently secure the parts of the structure in assembled and sealed relationship.

The means for admitting the liquid sealing material to the passageway may comprise a conventional pressure fitting of the type usually used to admit a lubricant under pressure to bearing surfaces. Such fittings are commonly referred to as "Zerk" fittings and need not be described in detail. Generally, however, those fittings are provided with a check valve permitting liquid material to pass therethrough in one direction but preventing return flow thereof.

It is therefore an object of this invention to provide a sealed structural joint having a sealing material therein which may be applied in liquid form.

It is another object of this invention to provide a joint whereby a structure may be first assembled and the parts mechanically locked together and thereafter sealed by the introduction of a positive seal material to the joint.

It is still another object of this invention to provide a container that may be assembled and mechanically locked in assembled position and the joints thereafter sealed permanently or temporarily, as desired.

A further object of this invention is to provide a structure having a sealed joint involving mechanical locking of the parts, which may comprise hard-to-work materials, such as reinforced thermosetting resins or the like.

A still further object of this invention is to provide a joint structure between panels having substantially coplanar edges to provide a positive mechanical lock therebetween and an effective seal between said edges.

An additional object of this invention is to provide a joint structure wherein adjacent panels are positively mechanically locked together in overlapping relation and having sealing means applied to said joint independently of said mechanical locking.

Another additional object of this invention is to provide a joint whereby a permanently assembled structure, employing adhesives, may be assembled without the application of adhesives during assembly.

Additional objects and advantages will become apparent to those skilled in the art as the description proceeds with reference to the accompanying drawings, wherein:

Fig. 1 is a side view of a container representing one type of container embodying the present invention;

Fig. 2 is a transverse sectional view through one modification of joint embodying the present invention;

Figs. 3, 4 and 5 are transverse sectional views of further modifications of the invention wherein integral edge portions of the panels mutually interlock;

Fig. 6 is a fragmentary view of a portion of a container embodying a modified form of joint;

Fig. 7 is a sectional view, on an enlarged scale, taken on line 7—7 of Fig. 6;

Fig. 8 is a sectional view, on an enlarged scale, taken substantially along the line 8—8 of Fig. 6;

Fig. 9 is a fragmentary view with portions broken away, similar to Fig. 6, but showing a further modification of the invention;

Fig. 10 is a sectional view on an enlarged scale, taken along the line 10—10 of Fig. 9;

Fig. 11 is a sectional view taken along the line 11—11 of Fig. 9;

Fig. 12 is a bottom plan view of the nut employed with the joint of Figs. 9 through 11;

Fig. 13 is a sectional view through a further modification of the present invention;

Fig. 14 is a transverse sectional view through a joint of the type shown in Fig. 13 but forming a corner of a structure;

Figs. 15, 16 and 17 are transverse sectional views of further modifications of the invention wherein integral edge portions of the structure panels are in overlapping and interlocking relation;

Fig. 18 is a fragmentary elevational view, partly in section, showing the joint of Fig. 2 adapted to cylindrical pipes or conduits;

Fig. 19 is a transverse sectional view through one of the circular clamping members of Fig. 18; and Fig. 20 is a transverse sectional view through a still further modified form of joint embodying the present invention.

In the drawings, Figs. 1 and 2 are the same as Figs. 1 and 11, respectively, of parent application Serial No. 209,169, whereas Figs. 3, 4 and 5 are the same as Figs. 5, 9 and 11, respectively, of parent application Serial No. 228,052.

Fig. 1 shows a container 2 of generally cylindrical shape merely by way of illustration, it being understood that the structure referred to herein may be a container of any other desired shape or may be any other structure not properly termed a "container."

Fig. 1 shows a structure embodying a plurality of adjacent panels 4 defining side walls of the structure and end panels 6 defining end closures. The side wall panels 4 are joined together along joints generally identified at "A," whereas the end panels 6 are joined to the aligned edges of the side panels 4 along peripheral joints "B."

Fig. 2 is a transverse sectional view through a joint that may be employed in the construction of the structure shown in Fig. 1 wherein adjacent panels 4 are provided with laterally bent flanges 8 terminating in reversely bent flange portions 9. The panels 4 may be constructed of any desirable material and it is contemplated that such joints be employed where the panels 4 comprise molded sheets of reinforced thermosetting or other resins. Such structures are particularly desirable in the handling of many products that cannot be satisfactorily stored or shipped in metal or wooden containers.

In the joint shown in Fig. 2, the flanges 8 and 9 of adjacent panels 4 extend into complementary channels in a clamping bar 10 extending longitudinally of the joint. The clamping bar 10 is provided with a medial inner rib 12 extending longitudinally thereof and between the flanges 9. On the outer side of the structure a sealing bar 14, having inwardly projecting flangelike portions 16, is nested within the channels defined by the flanges 8 and 9 with its outer surface substantially flush with the outer surfaces of the panels 4. The sealing bar 14 is provided with a longitudinally extending channel 18 into which the edge portions of the flanges 9 project.

Suitable fastening means such as the screws 20 (Fig. 1) extend through the sealing bars 14 and threadedly engage clamping bars 10, or metallic members embedded therein (not shown), to clamp the bars 10 and 14 together with the flanged edge portions of panels 4 held therebetween. By these means the complete structure shown in Fig. 1 may be assembled and mechanically locked in assembled condition.

The channel 18 in sealing bar 14 along with the edge portions of flanges 9 and the inner surface of rib 12 define a peripherally closed passageway extending continuously along the joint between the panels 4. A fitting 22 is provided on at least one of the sealing bars 14 and is a type of fitting having a passageway 24 therethrough communicating with a passageway 26 through the bar 14 and preferably provided with a ball check valve 28. By means of the fitting 22 a liquid sealing medium may be forced under pressure from the exterior of the assembled structure into the passageway defined by channel 18 and caused to flow therealong throughout the entire length of the joint to completely fill the closed passageway and effect a positive and efficient seal between the edges of the flanges 9 and thus completely and positively seal the joint throughout its length. The sealing material may be of any desired nature but must be sufficiently liquid in its initial state to be capable of being forced through the fitting 22 and caused to flow the length of the passageway. The material may be a material that will set and harden after a predetermined length of time and may further be a material that may be thereafter softened by the application of heat or other influence or may be a material that will remain permanently set. Unless the material is such that it acts as a "cement" for the material of the panels 4, even though it hardens, the structure may be disassembled at will and the sealing material thereafter removed from the channel 18 to condition the members for further use. In the event thermoplastic materials are employed as a sealing medium, they may be again liquefied by heat when it is desired to disassemble the structure.

It is contemplated that the closed passageways extending along joints A and B all be in communication with each other whereby all joints throughout the entire structure may be sealed from a single pressure fitting 22 in one of the sealing bars 14. Clearly, however, a pressure fitting 22 may be provided in a plurality of the sealing bars 14 on any structure and may even be provided in all of the sealing bars. By employing a fitting 22 having a check valve, the sealing liquid may be introduced under relatively high pressure and maintained under such pressure at all times. The ability to introduce and hold the sealing material under pressure is particularly desirable where the material is a type that later hardens with some attendant shrinkage in volume. By initially placing the liquid sealing material under pressure in the joint, subsequent shrinkage upon hardening will not cause the material to draw away from the sides of the closed passageway but it will remain in sealing contact therewith even after it has hardened.

The joint of Fig. 3 may be employed as an alternative to the Fig. 2 joint to join panels 4. Throughout the subsequent description adjacent panels of most forms of the invention will be referred to as the panels 4 since the panels so identified in Fig. 1 may be joined by any of the various modifications of joint structure shown and described herein.

In the modification of Fig. 3 an edge portion of one of the panels 4 is provided with a pair of spaced longitudinally extending integral ribs 30 defining a channel 32 therebetween. The outer panel 4 is provided with an integral edge portion defining a generally outwardly open channel 34 adapted to snugly receive the ribs 30 and with the outer surfaces of both panels 4 in flush relationship. The channel structure 34 is provided with a medial longitudinal rib 36 projecting between the ribs 30 and defining one wall of a longitudinal peripherally closed passageway in the channel 32. In this form also, suitable studs or threaded fastening means 20 are employed to mechanically clamp and lock the overlapping edge portions of the panels 4 in assembled relationship and the panel 4 which is provided with the ribs 30, is also provided with one or more of the pressure fittings 22 previously described.

In the modification of Fig. 4 one of the panels 4 is provided with a single longitudinally extending rib 38 snugly receivable in a channel 40 integrally formed on the edge of the other panel 4. A portion of the crest of rib 38 is cut away throughout the length thereof so that when the panels are assembled the cut-away portion defines, with the inner surface of the channel 40, a longitudinally extending and peripherally closed passageway 42 which may be filled with suitable liquid sealing material through the fitting 22 after assembly of the structure and mechanical clamping of the panels together by means of the studs 20.

The modification of Fig. 5 is very similar to that of Fig. 4, differing therefrom only in the general shape of the rib 38' and the channel 40'. Furthermore, in this form portions of both the rib 38' and the inner surface of channel 40' are cut away to define a generally cylindrical passageway 44 extending along the joint. In both the forms of Figs. 4 and 5, openings 46 and 48, respectively, provide communication between the pressure fittings 22 and the passageways extending along the joint for conducting the liquid sealing material to the passageways.

Fig. 6 shows a still further modified form of joint wherein the panels 4 are of a material more economically formed in flat sheets, such as thermosetting resins provided with fibrous reinforcing material therein. Many such materials are available as examplified by a presently available product known as "Fiberglas." This material consists of a mat of fibrous glass completely impregnated with a thermosetting resin such as "Bakelite." Such materials are difficult and expensive to form to the shapes shown in Figs. 1 through 5 and are more economical to produce in continuous sheet form. A structure according to the present invention may be constructed from such materials wherein the panel edges are unmodified and comprise substantially coplanar edge portions of the sheets defining the panels 4.

In the form shown in Figs. 6 through 8 the adjacent panels 4 are arranged with their edges 47 in spaced parallel relationship. Referring particularly to Fig. 7, a sealing bar 49 of any suitable material extends along the joint defined by the edges 47 and is of sufficient width to span the space between those edges and engage the inner faces of the adjacent edge portions of panels 4. An outer bar 50 similarly transversely spans the space between the adjacent edges of the panels 4 and overlies the bar 49. At spaced intervals along its length the bar 49 is provided with threaded studs 52 secured thereto in any suitable manner and projecting outwardly through the space between the parallel edges 47 of the panels 4. At positions corresponding to the locations of the studs 52 the bars 50 are provided with openings 54 substantially larger than the studs 52 and through which those studs project. Nuts 56 are threaded to the studs 52 and are provided with shoulders 58 engageable with the outer surfaces of the bars 50 to clamp the bars 50 to the bars 49 with the edges of panels 4 therebetween. The central portion of the nuts 56, inwardly of the shoulders 58, are complementary in size to the openings 54 in bar 50 and project thereinto toward the edge portions of the panels 4. The central portion of the nuts 56 in openings 54 constitutes bosses 60 provided at their outer peripheries with downwardly extending relatively sharp flanges 62. The flanges 62 engage circular grooves or depressions 64 in the upper surface of adjacent edge portions of the panels 4. The grooves or depressions 64 in one of the panels 4 are complementary to the corresponding grooves in the adjacent panel, are arcuate in shape and concentric to the axes of the studs 52 whereby the flanges 62 may be continuous circular flanges extending around the periphery of the lower end of bosses 60. It will be apparent that when nuts 56 are tightened on studs 52 to effect the desired clamping action, the flanges 62 enter grooves 64 and thereby constitute a positive lock preventing relative movement, laterally of the joint, between panels 4. The grooves 64 may be pre-cut in panels 4 and flanges 62 may be continuous. On the other hand, the flanges 62 may be discontinuous and comprise short arcuate sections with spaces between the ends thereof, in which case the panels 4 need not be provided with the grooves 64 beforehand since tightening of the nuts 56 would then have the effect of cutting the grooves 64 upon tightening thereof.

Selected studs 52 are provided with axial bores 66 therein communicating with transverse bores 68 extending laterally through the sides of the studs 52 into communication with the space between the edges 47 of the panels 4. It is to be noted that the inner surfaces of the bars 50 and 49 are spaced apart by a distance equal to the thickness of the panels 4 and since the edges 47 of those panels are spaced apart, the bars 48 and 50 and edges 47 define a peripherally closed passageway extending the length of the joint. The transverse bores 68 communicate with that passageway. Those studs 52 provided with the bores 66 and 68 are also provided with the pressure fittings 22 whereby liquid sealing material may be introduced into the passageway to effect a complete and perfect seal along the joint.

The form illustrated in Fig. 8 shows a joint between a side wall panel 4 and an end panel 6. The panel 4 of this figure is the same as one of the panels 4 of Fig. 7, whereas panel 6 constituting an end panel of the structure, is provided with a laterally extending flange 70 arranged in substantially coplanar relation to the adjacent edge of panel 4. The nut 56' of Fig. 8 is a separate element from the locking washer 72 corresponding in shape and function to the boss 60 described in connection with Fig. 7. When the nut 56' is tightened on the stud 52 it not only clamps the bars 49 and 50 to the adjacent edges of the panels but also forces the locking washer 72 downwardly against the panels to position flanges 62' in groove 64 to thereby mechanically lock the panels together. The section of Fig. 8 is taken through a stud 52 that is not provided with a pressure fitting 22 but it is to be understood that one of the studs along the joint illustrated in this figure may be provided with such a fitting in the manner shown in Fig. 7.

The edges 47 of the panels 4 and 6 are spaced apart and as clearly shown in Fig. 6 the passageways extending along the joints A and B are in communication with each other so that it is possible to provide the entire structure with only a single pressure fitting 22.

The modification shown in Figs. 9 through 12 is similar to that of Figs. 6 through 8 in that adjacent panels 4 are not provided with flanges or molded channels or ribs at their edges. In this modification, however, the edges 76 of the panels 4 and flanges 70' of panel 6 are coplanar and in edge abutting relation throughout the length of the joint. Adjacent edges 76 are provided with opposed notches 78, each pair of which defines an opening through the joint to receive a stud 80 (see Fig. 9). The studs 80 are fixedly secured to an inner sealing bar 82 of sufficient width to laterally span the joint. The bars 82 are provided with longitudinally extending channels 84. Each stud 80 is provided with a collar 86 fixedly secured thereon and having an upper shoulder or abutment surface 88 arranged in coplanar relation to the surfaces 90 of the panel engaging portions of the bar 82. From the collars 86 the studs 80 extend through the openings defined by opposed notches 78 and are threadedly engaged by suitable nuts 92. The nuts 92 bear directly on the outer surfaces of the panels 4 to clamp those panels against the sealing bar 82 and the upper abutment surfaces of collars 86. Adjacent edge portions of the panels 4 are provided with annular grooves 94 on both surfaces thereof with the grooves concentrically arranged about the axis of the stud 80. The upper surface of the collar 86 is provided with complementary ribs 96 engaging the grooves 94 to thereby rigidly lock the panel edges against lateral movement away from each other. The nuts 92 hold the panel edges firmly against the ribs 96 to mechanically lock the structure in assembled relation. The nut 92 is also provided with ribs 98 complementary to and engaging in the grooves 94 on the outer surfaces of the panels. The grooves 94 on the inner surfaces of the panels, which mate with the ribs 96 on collar 86 must necessarily be preformed in the panel structure. The grooves 94 in the outer surfaces of the panels, however, need not be preformed. The nuts 92 may have the ribs 98 formed as interrupted arcuate segments with relatively sharp end surfaces whereby rotation of the nuts 92 on the studs will cause the ribs 98 to cut their own mating grooves in the outer surface of the panels. Fig. 12 shows a bottom view of the nut 92 to indicate the segmental form of the ribs 98.

Fig. 10 is a sectional view through a stud 80', similar in all respects to that described in connection with Fig. 11 except that the stud is provided with a longitudinal bore 100 and a transverse bore 102 communicating therewith and with the channel 84 in clamping bar 82. A pressure fitting 22, of the type previously described, is mounted on the stud 80' and provides means for introducing a liquid sealing material into the channels 84 to engage the edge portions of both panels defining the joint and to provide a positive and perfect seal for the structure.

Figs. 13 and 14 show a further joint possible with panels constructed of the resinous material previously described wherein the panels are formed with transversely extending flanges 104 at their edges. Such simple flanges as those shown at 104 are relatively easy to provide even on materials of the type contemplated.

The joint is assembled by placing adjacent panels 4 in position with their flanges 104 extending into and engaging opposite sides of a channel 106 in a sealing bar 108. A clamping bar 110 engages the outer surfaces of the edge portions of the panels 4 and is provided with a longitudinal rib 112 extending snugly between the flanges 104. The rib 112 does not extend to the bottom of the channel 106 but leaves a peripherally closed passageway 114 in the joint. It is to be noted that the passageway 114 is defined at least in part by edges of the flanges 104 and consequently by edge portions of the panels 4. Suitable threaded studs (not shown) are employed to clamp the bars 108 and 110 together to mechanically lock the parts in assembled relationship.

At the desired positions along the bar 110 an opening or openings 116 are provided in communication with the inner end of a pressure fitting 22 through which fluid sealing material may be introduced to the passageway 114 to seal the joint, all as previously described.

Fig. 13 illustrates a joint between panels 4 arranged in substantially coplanar relationship and forming a side wall of a structure whereas Fig. 14 illustrates essentially the same joint assembled with corresponding bars 108' and 110' so configured as to hold the panels 4 in right angular relationship to form a joint between different side walls of a structure and to define a corner thereof. In all other respects the showing of Fig. 14 is the same as that of Fig. 13, there being no difference whatsoever in the panels themselves.

Fig. 15 is the same joint structure as illustrated in Fig. 3 and described in connection therewith but in reverse relationship. That is, Fig. 3 illustrates a joint for a structure having a smooth and continuous outer surface whereas the joint of Fig. 15 provides a smooth and continuous inner surface for the structure with the bulk of the joint projecting outwardly therefrom. The parts identified in Fig. 15 corresponding to similar parts of Fig. 3 bear the same reference numerals primed.

Figs. 16 and 17 illustrate similar joint structures wherein the edges of panels 117 are provided with integral V-shaped channel structures 118 and wherein corresponding edges of panels 120, which are arranged in overlapping relation to the channeled edges of panels 117, are provided with integral rib structures 122 complementary in shape to the V-shaped channels 118 and snugly receivable therein. Suitable studs (not shown) extend through the mating channel and rib formations 118 and 122 to mechanically clamp the joint in assembled relationship. The inner surfaces of the ribs 122 are provided with grooves 124, which may be sinuously arranged along the mating surfaces and extend continuously from end to end of the joint to define a peripherally closed passageway therealong.

In the form of Fig. 16, the rib 122 is provided with a reinforcing rod 126, of aluminum or the like, embedded therein to add strength to the structure and to provide means into which the clamping studs are threaded.

Fig. 16 shows a joint in a structure having a smooth and continuous inner surface whereas Fig. 17 shows the same joint adapted to a structure having a smooth and continuous outer surface. In each instance, the outer panel is provided with a pressure fitting 22 at some point along the joint and having communication, through a suitable bore 128, with the continuous groove 124 previously described. Thus, a suitable liquid sealing medium may be introduced through the fitting 22 into the passageway 124 to seal the joint. This form is particularly useful when it is desired to introduce a liquid sealing material which also constitutes a cement for the material of the panels. The arrangement of the groove 124 is such that the cement material is distributed substantially uniformly throughout the entire mating surfaces between channels 118 and ribs 122 and sufficient pressure may be applied to the liquid cement to force a film thereof laterally outwardly of the grooves between the engaging surfaces themselves to effectively and completely cement the panel edges together to form a permanently assembled structure.

Figs. 18 and 19 illustrate a manner in which a joint corresponding to that shown in Fig. 2 may be adapted to a conduit or pipe. In this form the side walls of the structure are defined by cylindrical panels 130 having peripheral flange structures 132 at their end edges. The flange structures 132 are substantially identical in configuration and function to those described in connection with Fig. 2. The inner and outer bars 134 and 136, respectively, are circular in shape and are preferably formed as split rings, as illustrated in Fig. 19. It is necessary, during assembly of the structure, to collapse the inner ring 134 sufficiently to engage the inwardly directed flange structure and it is also necessary to radially expand the outer bar 136 to position the same over the outwardly extending flange structures 132. Only the inner ring 134 need be formed as shown in Fig. 19. The outer ring 136 may constitute a plurality of segments that may be individually positioned as shown and clamped therein by means of the studs 138. At one position around the joint of Fig. 18, the outer bar 136 is provided with a pressure fitting 22 whereby a liquid sealing material may be introduced under pressure into the peripherally closed passageway 140 to completely and effectively seal the pipe or conduit at the joints.

The modification of Fig. 20 comprises panels 4 arranged similarly to the panels 4 described in connection with Figs. 6 through 8 and the clamping and sealing bars 82' and 50' correspond in all essential respects to the bars 82 of Fig. 10 and bar 50 of Fig. 7, respectively. Studs 142 extend between the adjacent edges 46 of the panels 4 and suitable nuts 144 are threaded thereon outwardly of the bar 50' to clamp the structure in assembled relation. In this form also the panels 4 are provided with grooves 64, as described in connection with Figs. 6 to 8 and a locking washer 72 is provided with a peripheral flange 62 engaging the groove 64 to lock the panels 4 against relative lateral movement.

In this form it is not contemplated that a liquid seal be introduced into the passageway 148 but that the passageway be initially filled with a suitable self-sustaining but flowable resilient material 150 before assembly of the structure. The material 150 may be rubber or any similar material, and preferably is of such dimension that its transverse sectional area is normally slightly greater than the sectional area of the passageway 148. When the structure is assembled, the edge portions of the panels 4 compress the material into channel 148 into tight sealing relation with the walls of the channel and the edges of the panels 4 and cause some longitudinal flow of the material to thus effect a tight seal along the joint, which can be readily disassembled. In this form it is not necessary to supply a separate liquid sealing material to be applied in the field.

A limited number of specific embodiments of the invention have been shown and described herein but it is to be understood that many other forms may be resorted to within the scope of the appended claims.

I claim:

1. In a structure having wall panels, means defining a joint between adjacent edges of adjacent panels, said means including means interlocking with edge portions of said panels and mechanically holding said panels in rigidly fixed assembled relationship against relative movement in either direction transverse to said joint, clamp means holding said interlocking means in interlocked relation, said joint means further defining a peripherally closed passageway extending continuously along said joint for the length thereof, the walls of said passageway being defined at least in part by integral edge portions of each of said adjacent panels, and means defining a conduit extending to the exterior of said structure and communicating with said passageway whereby a liquid sealing material may be introduced under pressure into and forced along said passageway to seal said joint.

2. A structure as defined in claim 1 including means defining additional joints on said structure, some of which extend transversely across said first-named joints, all of the joints being of similar construction with their passageways in communication with each other whereby liquid sealing material introduced into one of said passageways may flow into and seal all of said joints.

3. A structure as defined in claim 1 wherein said interlocking means mechanically holding said panels in assembled relationship comprises laterally directed flanges on the adjacent edges of said panels, elongated members extending along said joint and engaging the inner and outer faces, respectively, of the adjacent edges of said flanges and interlocking with said flanges, and means for clamping said elongated members and panels together.

4. A structure as defined in claim 1 wherein said interlocking means mechanically holding said panels in assembled relationship comprises integral overlapping and interlocking adjacent edges on said adjacent panels, said overlapping edges being formed to define said passageway therebetween, and means clamping said overlapped edges together.

5. A structure as defined in claim 1 wherein said adjacent edges of said panels are in overlapping relation, the overlapping portions thereof being provided, respectively, with nested rib and channel formations extending longitudinally of said joint, portions of said formations being cut away to define said passageway.

6. A structure as defined in claim 5 wherein said panels are of reinforced resinous material whereby a liquid sealing material constituting a cement for said resinous material may be introduced into said passageway to seal said joint and permanently cement said panels together.

7. In a structure having wall panels joined at their edges; said panels having integral edge portions defining opposed channels, said channels opening in a direction substantially normal to said panels, one of said channels being snugly received within the other to lock said panels against relative movement in either direction transverse to said channels and to define an enclosed chamber extending along the joint between said panels defined by said channels, clamp means holding said channels in the described relationship, and a fitting providing communication with the interior of said chamber whereby flowable sealing material may be forced into said chamber under pressure and forced to flow therealong to fill the same and be maintained under pressure therein.

References Cited in the file of this patent

UNITED STATES PATENTS

| | | |
|---|---|---|
| Re. 21,524 | Gramelspacher | Aug. 6, 1940 |
| 429,660 | Sullivan | June 10, 1890 |
| 935,376 | Lennon | Sept. 28, 1909 |
| 1,597,167 | Pace | Aug. 24, 1926 |
| 1,934,022 | Wiggins | Nov. 7, 1933 |

FOREIGN PATENTS

| | | |
|---|---|---|
| 564,745 | Great Britain | Oct. 11, 1944 |